(12) United States Patent
Lawrence et al.

(10) Patent No.: US 11,908,253 B2
(45) Date of Patent: Feb. 20, 2024

(54) DYNAMIC DATA PRESERVATION BASED ON AUTONOMOUS VEHICLE PERFORMANCE NEEDS

(71) Applicant: GM Cruise Holdings LLC, San Francisco, CA (US)

(72) Inventors: Audrey Lawrence, San Francisco, CA (US); Sam McCabe, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 7 days.

(21) Appl. No.: 16/217,353

(22) Filed: Dec. 12, 2018

(65) Prior Publication Data

US 2020/0193736 A1  Jun. 18, 2020

(51) Int. Cl.
*G07C 5/08* (2006.01)
*B60W 50/04* (2006.01)
*B60W 60/00* (2020.01)

(52) U.S. Cl.
CPC .............. *G07C 5/085* (2013.01); *B60W 50/04* (2013.01); *B60W 60/001* (2020.02); *B60W 2050/046* (2013.01); *B60W 2556/55* (2020.02)

(58) Field of Classification Search
CPC ....................... G07C 5/00; G07C 5/008; G07C 5/0841–0891; G07C 7/00; G05D 1/0088; G05D 1/00; B60W 2556/00–60; B60W 60/00; G08G 1/00; G01C 21/00; G06F 16/00; B64D 2045/00; B64D 45/00; B64D 2045/0065
USPC .................................... 701/23–28, 29.1–34.4
See application file for complete search history.

(56) References Cited

U.S. PATENT DOCUMENTS

| | | | |
|---|---|---|---|
| 7,281,097 B1 * | 10/2007 | Lawson ............... | G06F 3/0613 711/154 |
| 7,499,774 B2 | 3/2009 | Barrett et al. | |
| 9,412,417 B2 * | 8/2016 | Jobs .................... | G06F 16/4387 |
| 10,146,436 B1 * | 12/2018 | Natanzon ............. | G06F 3/0608 |
| 2003/0090531 A1 | 5/2003 | Wong et al. | |
| 2004/0199511 A1 * | 10/2004 | Fujisawa ............. | G11B 27/002 |

(Continued)

FOREIGN PATENT DOCUMENTS

CN  105403781 A  11/2018

*Primary Examiner* — Jeffrey C Boomer
*Assistant Examiner* — Paul Allen
(74) *Attorney, Agent, or Firm* — CALFEE, HALTER & GRISWOLD LLP (57) ABSTRACT

A computing system with a data store including storage priorities each associated with a different predefined event type. The storage priority indicating a likelihood detection of the predefined event type by an autonomous vehicle causes the autonomous vehicle to store sensor system output from a sensor system in the autonomous vehicle. The computing system can receive a data storage request indicating a request for the autonomous vehicle to store sensor system output for a specific predefined event type. The computing system can further update the storage priorities. Updating the storage priorities includes updates a storage priority associated with the specific predefined event type based on a parameter of specific predefined event type. The computing yet further can transmit the updated storage priorities to the autonomous vehicle which causes the autonomous vehicle to change the amount of sensory system output stored by the autonomous vehicle.

20 Claims, 5 Drawing Sheets

(56) References Cited

U.S. PATENT DOCUMENTS

| | | | |
|---|---|---|---|
| 2009/0198689 A1 | 8/2009 | Frazier et al. | |
| 2012/0310474 A1* | 12/2012 | Sakakibara | G07C 5/085 |
| | | | 701/33.4 |
| 2013/0110344 A1* | 5/2013 | Merg | G07C 5/0808 |
| | | | 701/31.4 |
| 2015/0088335 A1* | 3/2015 | Lambert | G08G 1/20 |
| | | | 701/1 |
| 2015/0181172 A1* | 6/2015 | Plante | G06F 9/451 |
| | | | 348/148 |
| 2015/0325062 A1* | 11/2015 | Mason | G07C 5/008 |
| | | | 701/29.3 |
| 2016/0364921 A1* | 12/2016 | Iyoda | G07C 5/0841 |
| 2017/0092018 A1* | 3/2017 | Throop | G07C 5/0816 |
| 2017/0111183 A1* | 4/2017 | Kojima | G07C 5/0841 |
| 2017/0113664 A1* | 4/2017 | Nix | B60T 8/17558 |
| 2017/0330397 A1* | 11/2017 | Palmer | H04N 7/181 |
| 2018/0048850 A1* | 2/2018 | Bostick | G06V 20/56 |
| 2018/0191584 A1* | 7/2018 | Bondar | H04L 43/024 |
| 2018/0261020 A1* | 9/2018 | Petousis | G07C 5/0841 |
| 2018/0293809 A1* | 10/2018 | James | H04L 67/125 |
| 2019/0229976 A1* | 7/2019 | Dhesikan | H04L 41/0604 |
| 2019/0266029 A1* | 8/2019 | Sathyanarayana | G06F 9/542 |
| 2019/0266264 A1* | 8/2019 | Michalakis | H04L 67/2857 |
| 2019/0385383 A1* | 12/2019 | Sato | B60W 30/08 |
| 2020/0065711 A1* | 2/2020 | Clement | G06N 3/08 |
| 2020/0166941 A1* | 5/2020 | Yu | G08G 1/0112 |
| 2020/0175788 A1* | 6/2020 | Park | G07C 5/0816 |

\* cited by examiner

DYNAMIC DATA PRESERVATION BASED ON AUTONOMOUS VEHICLE PERFORMANCE NEEDS

BACKGROUND

An autonomous vehicle is a motorized vehicle that can operate without a human driver. The autonomous vehicle relies on systems of sensors to navigate about a roadway. As the autonomous vehicle operates, the sensor systems can generate a large amount of sensor system output that can then be stored in the autonomous vehicle for later use, such as for training and/or research. However, internal storage of the autonomous vehicle is finite and the large amount of output from the sensor systems can quickly fill the internal storage. The autonomous vehicle would then have to offload a portion of the currently stored output from the sensor systems in order to store any new output. Conventionally, due to the amount of the sensor system output to be offloaded, the autonomous vehicle may be taken out of operation and sent to a designated offload location. Thus, storing all sensor system output from the sensor systems in the autonomous vehicle during operation can limit the amount of time the autonomous vehicle can be in operation.

SUMMARY

The following is a brief summary of subject matter that is described in greater detail herein. This summary is not intended to be limiting as to scope of the claims.

Described herein are various technologies pertaining to remotely selecting which sensor system output from sensor systems in an autonomous vehicle to preserve in internal storage of the autonomous vehicle. With more specificity, a computing system can assign a storage priority to a predefined event detectable by the sensor systems in the autonomous vehicle; the storage priority is then transmitted to the autonomous vehicle or autonomous vehicles. The storage priority can indicate a likelihood that detection of the predefined event by the autonomous vehicle causes the autonomous vehicle to store sensor system output from the sensor systems. More specifically, a computing system in the autonomous vehicle can be configured to create a snapshot of sensor system output from the sensor systems when the predefined event is detected by the autonomous vehicle. The snapshot can include sensor system output from the sensor systems before, during, and/or after the event. The storage priority can indicate a likelihood that the snapshot created based on detection of the predefined event will be stored in the autonomous vehicle. A user can assign different storage priorities to different predefined event types and can thus select which predefined event types will cause the autonomous vehicle to store sensor system output from the sensor systems.

In one example, a computing system includes a data store with storage priorities that are each associated with a different predefined event type. Responsive to receiving a data storage request indicating a specific predefined event type, the computing system can update the storage priorities. The computing system can update a storage priority associated with the specific predefined event type. The storage priority associated with the specific predefined event type can be updated based on a parameter of the specific predefined event type. The computing system can then transmit the updated storage priorities to the autonomous vehicle which cause the autonomous vehicle to change the amount of sensor system output stored by the autonomous vehicle.

The above-described technologies present various advantages over conventional sensor system output storage approaches. First, unlike the conventional storage approach of storing all sensor system output while the autonomous vehicle is operational, the above-described technologies enable selective storage of the sensor system output relying on occurrence of a predefined triggering event before sensor system output is retained in the autonomous vehicle. Secondly, the above-described computing system allows a user to dynamically rank the predefined triggering events by assigning a percentage chance the occurrence of the triggering event causes the autonomous vehicle to store the sensor system output. Third, the above-described computing system allows for the user to uniformly update a storage priority associated with a specific predefined event type across a plurality of autonomous vehicles.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to selecting are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Moreover, as used herein, the term "snapshot" is intended to encompass data output by a sensor system over a specific period of time. The period of time may include any suitable amount and may be selected by a user.

Disclosed is a computing system that permit a user to remotely control the amount and type of operation data generated by an autonomous vehicle that will be stored within the autonomous vehicle. As the autonomous vehicle is in operation, sensor systems within the autonomous vehicle continuously generate sensor system output, however local storage capacity within the autonomous vehicle is limited and the autonomous vehicle may run out of space to store the sensor system output for later use. The disclosed computing system can assign a storage priority to a predefined event type which prioritizes storing sensor system output generated when the predefined event type is detected. For instance, a storage priority to always store sensor system output can be assigned to detection of a passenger in the autonomous vehicle taking manual control of the autonomous vehicle (i.e. using the steering wheel to maneuver the vehicle). The computing system can further assign different storage priorities to different predefined event types. For instance, a first storage priority to always store sensor system output can be assigned to a first predefined event type and a second storage priority to occasionally store sensor system output can be assigned to a second predefined event type.

The storage priority for a predefined event type can further be dynamically adjusted based on an entered request. For instance, a user can request that detection of a specific predefined event type cause storage of sensor system output. The storage priority can then be updated based on the request. For example, the storage priority can be updated based on a parameter of the storage priority.

Once the storage priority associated with the specific predefined event type is updated, the computing system can then transmit the updated storage priority to the autonomous vehicle. The autonomous vehicle can then incorporate the updated storage priority to change the amount and type of sensor system output stored by the autonomous vehicle. Accordingly, detected predefined event types can trigger storage of sensor system output generated before, during, and/or after detection of the event. Further, the computing system for assigning storage priorities and/or dynamically adjusting storage priorities can be located remotely from the autonomous vehicle.

Figure 1:
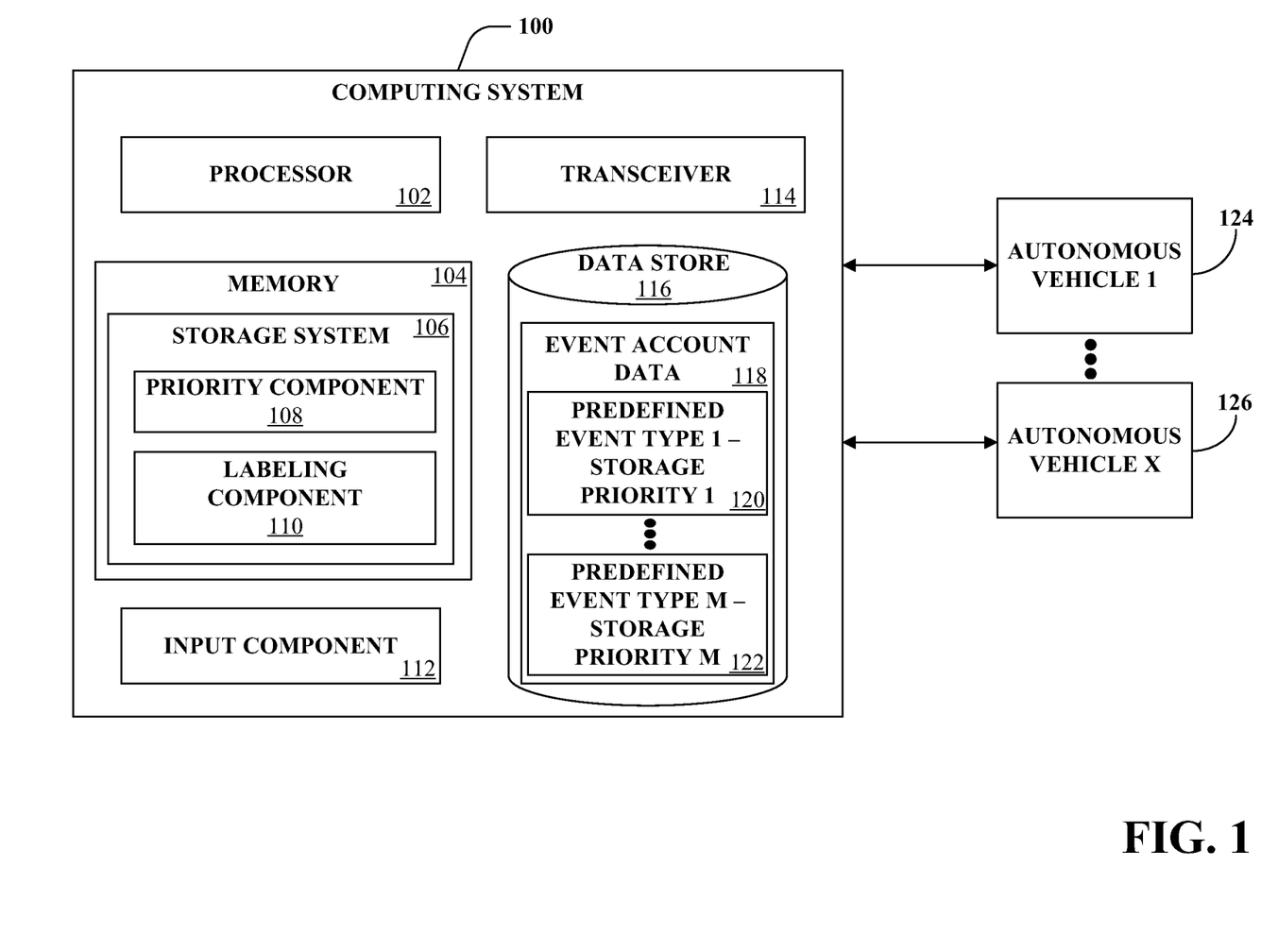
FIG. 1 illustrates an exemplary computing system.

With reference now to FIG. 1, an exemplary computing system 100 for performing the above described operations is illustrated. The computing system 100 may include a data store 116 which stores a plurality of predefined event types. The predefined event type can include any event detectable by a sensor system in a vehicle. The predefined event type can include information that can be used by a computing system to determine whether a predefined event has occurred based on sensor system output from the sensor system in the vehicle. The vehicle described herein may be an autonomous vehicle as shown in FIG. 1. However, it is contemplated that the vehicle can additionally or alternatively be human driven. Exemplary predefined event types include, but are not limited to, a hard stop (e.g., deceleration above a threshold), a sudden turn (e.g., direction change rate above a threshold), and/or a traffic jam (e.g., velocity below a threshold velocity for an extended threshold period of time). The predefined event types can further include a passenger of the autonomous vehicle taking manual control of the autonomous vehicle, the autonomous vehicle making an unprotected left turn where the autonomous vehicle makes a left turn at an intersection where there is no traffic light to signal the turn, the autonomous vehicle maneuvering around a bicycle, and/or the like.

The data store 116 may include event account data 118 which may include a plurality of accounts. Each account can correspond to a different predefined event type. The account for the predefined event type may have assigned therewith a storage priority. For instance, a first predefined event type (e.g., the autonomous vehicle having velocity below a threshold velocity for an extended threshold period of time) may have assigned therewith a first storage priority.

The storage priority can indicate a likelihood that detection of the associated predefined event type will cause the autonomous vehicle to store generated data in the autonomous vehicle. For example, the storage priority can be a percentage chance along a spectrum from 0% (i.e. never store) to 100% (i.e. always store). The percentage chance can indicate the odds that detection of the associated predefined event type will trigger storage of generated data. For instance, where the storage priority is 33.33%, detection of the predefined event type has a 33.33% chance of triggering localized storage in the autonomous vehicle of data generated before, during, and/or after the predefined event type.

Each of the plurality of predefined event types includes at least one storage priority. For example, as shown in FIG. 1, the event account data 118 includes an account 1 120 including a storage priority 1 associated with predefined event type 1, . . . , and an account M 122 including a storage priority M associated with predefined event type M, where M can be substantially any integer greater than one.

The computing system 100 may further include a processor 102 and memory 104 that includes computer-executable instructions that are executed by the processor 102. The memory 104 includes a storage system 106 that may be configured to receive a request to store generated data when a specific predefined event type is detected. The storage system 106, in response to receiving the request, may be further configured to update a storage priority associated with the specific predefined event type. Based on the received data storage request, the storage system 106 can update a current storage priority associated with the specific predefined event type stored in the data store 116 prior to receiving the request. In an embodiment, the storage system 106 can be yet further configured to update one or more of the storage priorities associated with a predefined event type(s) that is different from the specific predefined event type.

The storage system 106 may be further configured to transmit data indicative of the updated storage priorities to a computing system in an autonomous vehicle. The data can further cause the computing system in the autonomous vehicle to change the amount and type of sensor system output stored by the autonomous vehicle by replacing one or more storage priority stored in the autonomous vehicle prior to receipt of the updated storage priorities. Thus, storage priorities can be changed remotely from the autonomous vehicle and the computing system for updating a storage priority in response to a request need not be stored in each autonomous vehicle.

As shown in FIG. 1, the storage system 106 includes a priority component 108 and/or a labeling component 110. The priority component 108 can be configured to update a storage priority associated with a predefined event type, as will be described in detail below. The labeling component 110 can be configured to receive data indicative of information generated by an autonomous vehicle.

The priority component 108 is configured to receive a data storage request and to update one or more storage priority based on the data storage request. The data storage request can comprise a request for an autonomous vehicle to store data generated by the autonomous vehicle before, during, and/or after the autonomous vehicle detects a specific predefined event type. The data storage request can specify one or more different predefined event types. The request can be provided by a user (e.g., research and development (R&D) personnel) and/or can be automatically generated based on past behavior of the autonomous vehicle. For instance, R&D personnel can request that an autonomous vehicle store data generated by the autonomous vehicle when the autonomous vehicle makes an unprotected left turn. The request can further include a number of times the specific predefined event type is set to trigger storage of the generated data. For example, a user can request that data be stored for 5,000 detections of the autonomous vehicle making an unprotected left turn. The computing system 100 may further include an input component 112 operable by a user to enter a data storage request. The input component 112 can comprise any suitable component for data input (e.g., touchscreen, mouse, keyboard, trackpad, trackwheel, etc.).

The data storage request can also be automatically generated based on training needs of the autonomous vehicle. An autonomous vehicle may rely on a model for how to handle a specific situation. A model can include any parameter for operation of the autonomous vehicle, such as maneuvering around a bicycle on a road, recognizing an emergency vehicle, making a smoother right turn, and/or the like. The autonomous vehicle can include a plurality of different models that are each associated with one or more of the predefined event types. A model is trained and/or becomes more accurate using sensor system output generated by a sensor system in an autonomous vehicle.

The data storage request can be automatically generated based on priority of training a model. For instance, as a model is improved, a storage priority associated with the predefined event type that is associated with training the model can decrease. In an illustrative example, a first model and a second model are being trained and are associated with a first and a second predefined event type, respectively. In an initial state, a first storage priority associated with the first predefined event type and a second storage priority associated with the second predefined event type can be equal. As the first model improves the second storage priority can dynamically be updated to be higher than the first storage priority by automatically generating a data storage request for the second predefined event type and/or an indication to update the first storage priority.

Responsive to receiving the data storage request, the priority component 108 can update a storage priority associated with the specific predefined event type. The update may be based on a characteristic(s) of the request, a characteristic(s) of the current storage priorities, and/or a characteristic(s) of the autonomous vehicle. The characteristic(s) of the request can include the type of predefined event type specified, the number of times requested, likelihood of the specific predefined event type occurring, the number of different predefined event types specified in the request, and/or the like. For instance, a specified predefined event type that has a lower training value for training an autonomous vehicle to operate will be may be updated differently than a specified predefined event type that has a higher training value. In another example, a request for 10,000 detections of a specific predetermined event may be updated differently than a request for 5,000 detections of the specific predetermined event. In a further example, a specified predefined event type with a lower likelihood of detection (e.g., rain in San Francisco) may be updated differently than a more commonly occurring event. In yet another example, a storage priority associated with a first specified predefined event type may be updated based on an updated storage priority associated with a second specified predefined event type. Both the first predefined event type and the second predefined event type can be specified in a data storage request.

The characteristic(s) of the current storage priorities can include the storage priority associated with the other predefined event types. For instance, the storage priority can be updated based on one or more current storage priorities each associated with another predefined event type not specified in the request. The characteristic(s) of the autonomous vehicle can include current operating software of the autonomous vehicle, data storage capacity of the autonomous vehicle, transfer rate data from the autonomous vehicle can be uploaded from the autonomous vehicle to a separate computing system (e.g., bandwidth), and/or the like.

Subsequent to updating the storage priorities, the priority component 108 may be further configured to transmit priority data to an autonomous vehicle. The priority data may signify only the updated storage priority(s) or may signify all the current storage priorities after the update.

In order to transmit the priority data to the autonomous vehicle, the computing system 100 may further include a transceiver 114. The transceiver 114 is configured to transmit data from the computing system 100 and/or receive data at the computing system 100. Thus, the computing system 100 can exchange data with the autonomous vehicle. The computing system 100 may be further configured to exchange data with a plurality of autonomous vehicles. As illustrated in FIG. 1, the plurality of autonomous vehicles may comprise an autonomous vehicle 1 124, . . . , and an autonomous vehicle X 126, where X can be substantially any integer greater than one. The plurality of autonomous vehicles can be in a single fleet of autonomous vehicles or can be in a plurality of different fleets of autonomous vehicles.

Figure 2:
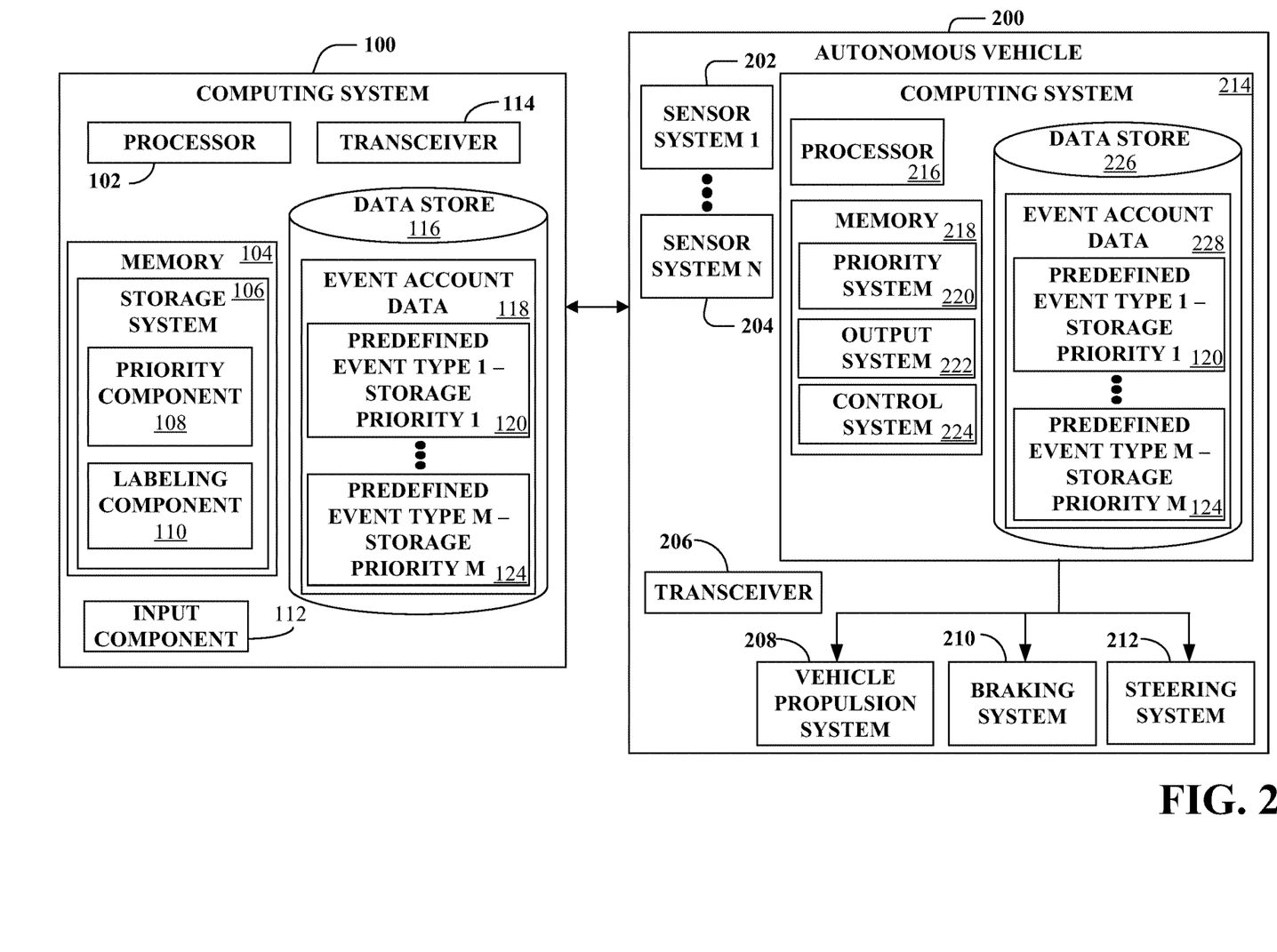
FIG. 2 illustrates an exemplary computing system in communication with an exemplary autonomous vehicle.

Turning now to FIG. 2, illustrated is an exemplary autonomous vehicle 200 that is in communication with the computing system 100. The autonomous vehicle 200 can navigate about roadways without human conduction based upon sensor signals output by sensor systems of the autonomous vehicle 200. The autonomous vehicle 200 includes a plurality of sensor systems, namely, a sensor system 1 202, . . . , and a sensor system N 204 (collectively referred to herein as sensor systems 202 and 204). The sensor systems 202 and 204 are of different types and may be arranged about the autonomous vehicle 200. For example, the sensor system 1 202 may be a lidar sensor system and the sensor system N 204 may be a camera (image) system. Other exemplary sensor systems 202 and 204 included are radar sensor systems, GPS sensor systems, sonar sensor systems, infrared sensor systems, and the like.

The autonomous vehicle 200 further includes several mechanical systems that are used to effectuate appropriate motion of the autonomous vehicle 200. For instance, the mechanical systems can include, but are not limited to, a vehicle propulsion system 208, a braking system 210, and a steering system 212. The vehicle propulsion system 208 may be an electric motor, an internal combustion engine, or the like. The braking system 210 can include an engine brake, brake pads, actuators, and/or any other suitable componentry that is configured to assist in decelerating the autonomous vehicle 200. The steering system 212 includes suitable componentry that is configured to control the direction of the movement of the autonomous vehicle 200.

The autonomous vehicle 200 additionally comprises a computing system 214 that is in communication with the sensor systems 202 and 204, the vehicle propulsion system 208, the braking system 210, and/or the steering system 212. The computing system 214 includes a processor 216 and memory 218 that includes computer-executable instructions that are executed by the processor 216. In an example, the processor 216 can be or include a graphics processing unit (GPU), a plurality of GPUs, a central processing unit (CPU), a plurality of CPUs, an application-specific integrated circuit (ASIC), a microcontroller, or the like.

The memory 218 includes a control system 224 configured to control operation of the vehicle propulsion system 208, the braking system 210, and/or the steering system 212. The memory 218 further includes a priority system 220 configured to receive the priority data transmitted from the computing system 100. Responsive to receiving the priority data, the priority system 220 may be further configured to update one or more storage priorities, as will be described in detail below.

In order to receive the transmitted priority data, the autonomous vehicle 200 may further include a transceiver 206. The transceiver 206 is configured to transmit data from the autonomous vehicle 200 and/or receive data at the autonomous vehicle 200. Thus, the autonomous vehicle 200 can exchange data with the computing system 100.

As illustrated in FIG. 2, the computing system 214 of the autonomous vehicle 200 includes a data store 226 that may include event account data 228. In an embodiment, the event account data 228 includes a plurality of predefined event types each associated with a different account. In the illustrated embodiment, the number of accounts and kind of each predefined event type in each account corresponds to the number of accounts and kind of each predefined event type in each account that is stored in the event account data 118 of the computing system 100. Each account can have associated therewith a storage priority. Responsive to receiving the transmitted priority data, the priority system 220 can further be configured to update one or more of the storage priorities. In one embodiment, the priority system 220 can be configured to replace all current storage priorities with the storage priorities indicated by the priority data. In another embodiment, the priority system 220 can be configured to compare the storage priorities indicated in the priority data and the current storage priorities in the event account data 228 and to replace the current storage priorities that differ compared to the storage priorities indicated in the priority data.

The memory 218 yet further includes an output system 222 configured to receive sensor system output from the sensor systems 202 and 204 of the autonomous vehicle 200. The output system 222 can be further configured to detect an event based upon sensor system output from the sensor systems 202 and 204. The detected event can comprise one or more of the predefined event types in the event account data 228 in the autonomous vehicle 200. The output system 222 can yet further be configured to store in the autonomous vehicle 200 sensor system output from the sensor systems 202 and 204. The sensor system output can be stored in any suitable memory in the autonomous vehicle 200, such as a virtual memory, the data store 226, and/or the like. As the autonomous vehicle 200 operates, the sensor systems 202 and 204 can continuously provide sensor system output to the output system 222 that can then store the sensor system output in the autonomous vehicle 200. In order to control the amount of sensor system output stored in the autonomous vehicle 200, the output system 222 can be further configured to manage the stored sensor system output.

Responsive to detection of a predefined event type, the output system 222 can be configured to define a snapshot of sensor system output. The snapshot can comprise sensor system output before, during, and/or after detection of the predefined event type. The amount of sensor system output that is included in the snapshot from before and/or after the event can be predefined and/or may depend on the pre-defined event type. For instance, where the predefined event type comprises a passenger in the autonomous vehicle 200 taking manual control of the autonomous vehicle 200, the snapshot can include sensor system output for two minutes leading up to the passenger taking control, while the passenger has manual control of the autonomous vehicle 200, and/or for two minutes after the passenger no longer has manual control of the autonomous vehicle 200.

The output system 222 can be further configured to determine whether to store the snapshot in the autonomous vehicle 200 based on the storage priority in the event account data 228 associated with the predefined event type that was detected. Where the storage priority for the detected predefined event type is 100% (i.e. always store), the created snapshot will always be stored in the autonomous vehicle 200. Conversely, where the storage priority for the detected predefined event type is 0% (i.e. don't store), the output system 222 will erase and/or write over the created snapshot. Where the storage priority for the predefined event type is between 0% and 100% (e.g., 40%), the output system 222 will store the snapshot 40% of the time and erase the snapshot 60% of the time.

Conversely, where the output system 222 does not detect a predefined event type, the output system 222 can be further be configured to erase and/or replace sensor system output that is currently stored in the autonomous vehicle 200. For example, the output system 222 can be configured to over-write sensor system output stored in the autonomous vehicle 200 older than a set threshold period of time (e.g., two minutes) with new sensor system output.

Thus, the output system 222 can be configured to limit the sensor system output stored in the autonomous vehicle 200 by creating and selectively storing snapshot(s) associated with a predefined event type or a plurality of predefined event types.

The output system 222 can yet further be configured to transmit the stored snapshot(s), via the transceiver 206, to a computing system that is remote from the autonomous vehicle 200. For instance, the remote computing system can comprise the computing system 100 described above with reference to FIG. 1 and FIG. 2.

The labeling component 110 in the storage system 106 of the computing system 100 can be configured to receive event data indicative of the snapshot" and to assign a label to one or more of the snapshots. The label can include identifying information such as a predefined event type associated with the snapshot, geographical location of the autonomous vehicle 200 when the snapshot was generated, identifying information about the autonomous vehicle 200 that transmitted the snapshot, and/or the like. For instance, the identifying information regarding the autonomous vehicle 200 can include an identity of the autonomous vehicle 200 and/or identity of a fleet of autonomous vehicle 200s the autonomous vehicle 200 is in. The labeling component 110 can further be configured to store the labeled snapshot or snapshots in the data store 116 of the computing system 100.

In an embodiment, the data storage request received by the priority component 108 further includes a specific number of snapshots for a predefined event type that should be received by the labeling component 110. The priority component 108 can be further configured to determine the number, if any, of snapshots for that predefined event type that are still needed based on the number of snapshots received by the labeling component 110 and the specified number. For instance, the data storage request can specify 5,000 instances of the autonomous vehicle 200 making a hard stop (e.g., deceleration above a threshold). The labeling component 110 can then receive 3,000 instances of an autonomous vehicle 200 making a hard stop. The priority component 108 can then determine that 2,000 instances still need to be received at the labeling component 110.

The priority component 108 may be configured to update the storage priority associated with the specific predefined event based on the remaining number of snapshots. For instance, where the remaining snapshots is low the priority component 108 may increase the storage priority to more rapidly fill the request. The priority component 108 can update the storage priority associated with the specific predefined event in the event account data 118 based on the remaining number of snapshots. The priority component 108 can then transmit new priority data indicative of the updated storage priority to one or more autonomous vehicle 200 causing the autonomous vehicle 200 to update the storage priority associated with the specific predefined event. Thus, the priority component 108 can continuously update storage priorities for a predefined event type or plurality of predefined event types based on data received from the autonomous vehicle 200 and/or data storage requests.

Because a storage priority or storage priorities that may be appropriate for one autonomous vehicle may be inappropriate for another autonomous vehicle, the computing system 100 can be further configured to transmit different storage priorities to different autonomous vehicles. For instance, a high storage priority for sensor system output while the autonomous vehicle operates during a snowstorm would be appropriate for an autonomous vehicle operating in San Francisco because of the rarity of the event; such a high storage priority for that event may not be appropriate for an autonomous vehicle operating in Minnesota. In addition to variation in geographical location of operation, two autonomous vehicles may vary in size of onboard memory, operating system versions, sensor systems 202 and 204, and/or the like.

Figure 3:
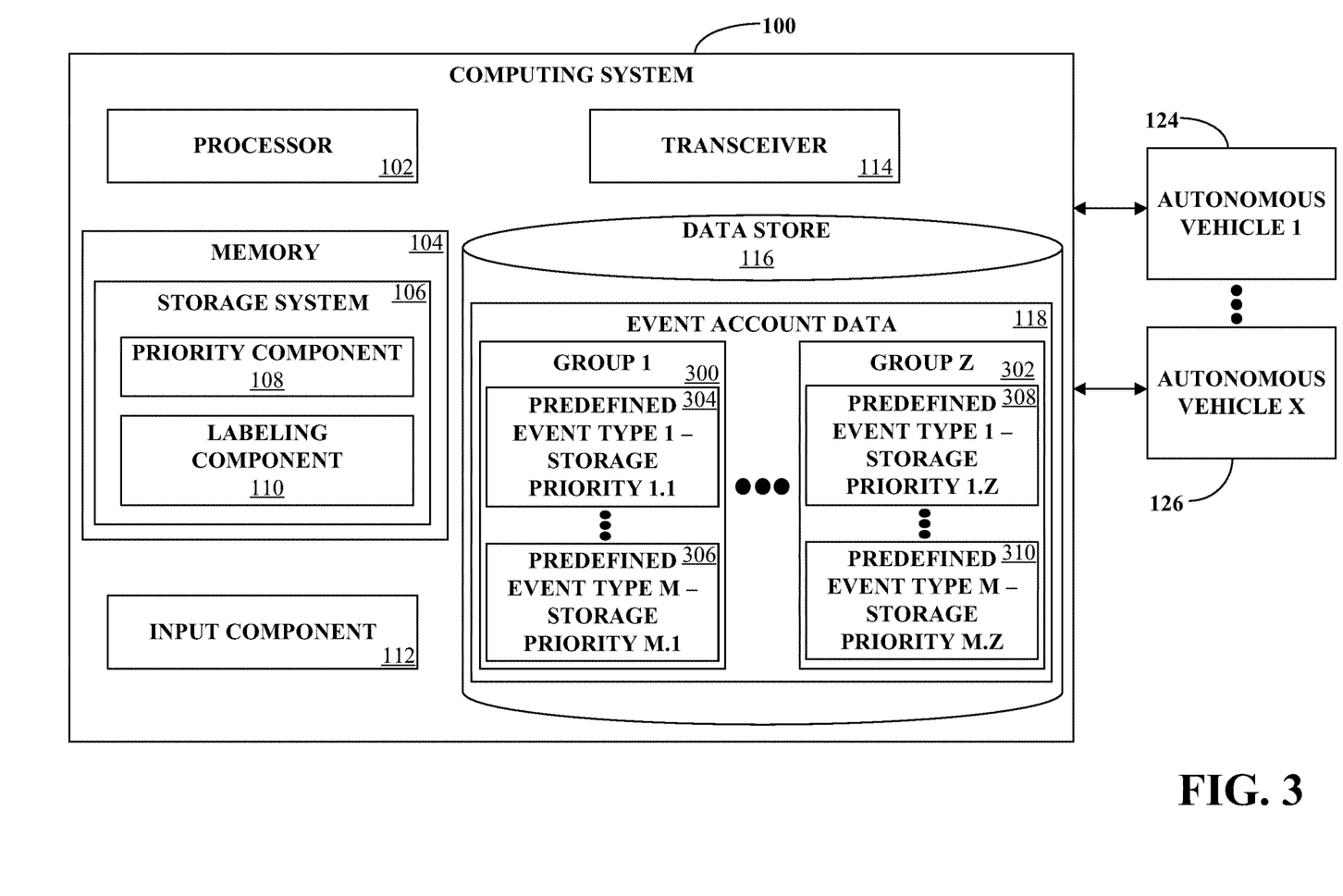
FIG. 3 illustrates another exemplary computing system.

As illustrated in FIG. 3, the event account data 118 in the data store 116 in the computing system 100 can include a plurality of different groups of predefined event type accounts. The number of accounts and kind of predefined event type in each account of the group can be similar for the different groups and/or can vary between groups. For instance, illustrated is an example where the predefined event type in an account is similar for each of the different groups. More specifically, the event account data 118 includes a group 1 300 with an account 1 304 associated with predefined event type 1, . . . , and an account M 306 associated with predefined event type M; . . . ; and a group Z 302 with an account 1 308 associated with predefined event type 1, . . . , and an account M 310 associated with predefined event type M.

The predefined event type accounts can be grouped based on any preferred factor. For instance, different groups can be established for different geographical locations of autonomous vehicle operation. In another example, different groups can be established for different versions of operating systems running on the autonomous vehicle. In a yet further example, different groups can be established based on the type of sensor system(s) in the autonomous vehicle.

A storage priority associated with an account of a predefined event type can vary across different groups and/or may be similar between one or more of the groups. For instance, as illustrated in FIG. 3, in group 1 300, account 1 304 associated with predefined event type 1 has a storage priority 1.1; whereas, in group Z 302, account 1 308 associated with predefined event type 1 has a storage priority 1.Z.

Responsive to receiving a data storage request identifying a specific predefined event type, the priority component 108 can be further configured to update a storage priority associated with the specified predefined event type in one or more of the different groups. In one embodiment, the priority component 108 updates the storage priority associated with the specified predefined event type in only one group. In another embodiment, the priority component 108 updates the storage priority associated with the specified predefined event type in a plurality of groups. The updated storage priority associated with the specified predefined event type may be similar for different groups and/or may vary between groups.

The priority component 108 can be further configured to transmit one or more of the groups in the priority data to one or more autonomous vehicles. For instance, as illustrated in FIG. 3, the computing system 100 can be in communication with an autonomous vehicle 1 124, . . . , and an autonomous vehicle X 126, where X can be substantially any integer greater than one. In one example, the priority component 108 transmits the same group to a plurality of autonomous vehicles that may or may not be part of the same fleet of autonomous vehicles. In another embodiment, the priority component 108 transmits different groups to different autonomous vehicles of the same fleet of autonomous vehicles.

Figure 4:
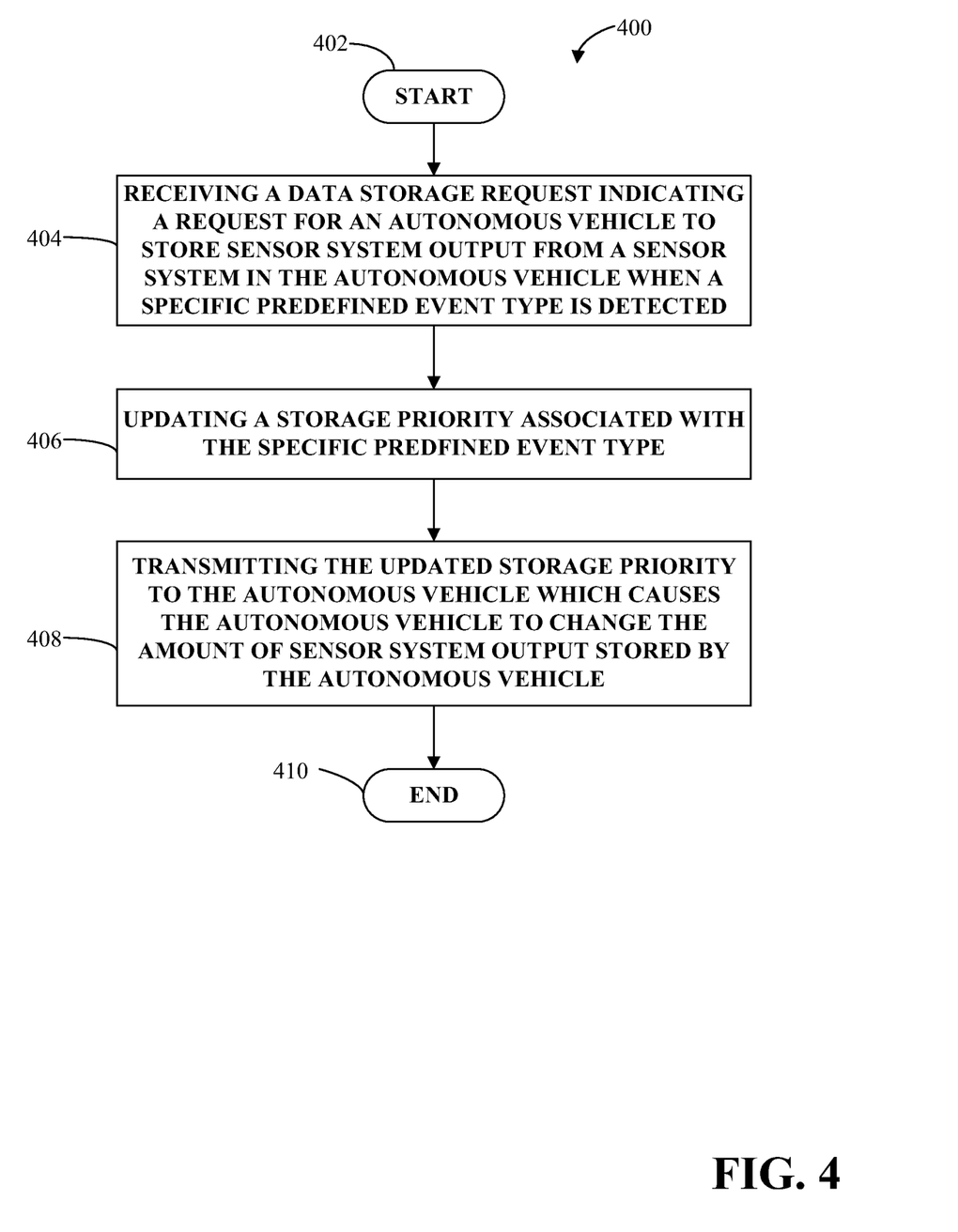
FIG. 4 is a flow diagram that illustrates an exemplary methodology executed by processor in a computing system for updating a storage priority.

FIG. 4 illustrates an exemplary methodology relating to providing a support message for a passenger of an autonomous vehicle. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

Referring now to FIG. 4 an exemplary methodology 400 is illustrated. The methodology starts at 402, and at 404, a processor receives a data storage request indicating a request for an autonomous vehicle to store sensor system output from a sensor system in the autonomous vehicle when a specific predefined event type is detected by the autonomous vehicle. At 406, responsive to receiving the request, the processor updates a storage priority associated with the specific predefined event type. The storage priority can indicate a likelihood detection of a predefined event type causes the autonomous vehicle to store the sensor system output. The storage priority associated with the specific predefined event type can be updated based on a parameter of the specific predefined event type. At 408, responsive to the upgrade, the processor transmits the updated storage priority to the autonomous vehicle which causes the autonomous vehicle to change the amount and/or type of sensor system output stored by the autonomous vehicle. The methodology 400 concludes at 410.

In an embodiment, the data storage request further indicates a number of incidents of the specific predefined event type that cause the autonomous vehicle to store sensor system output from the sensor system. The processor can additionally update the storage priority associated with the specific predefined event type based on the indicated number.

In a version of this embodiment, the methodology 400 further includes receiving, at the processor, event data from the autonomous vehicle signifying sensor system output that was stored in the autonomous vehicle in response to detection of the specific predefined event type. The event data can indicate the number of incidents that the autonomous vehicle stored snapshots for. Responsive to receiving the event data, the processor can update storage priority associated with the specific predefined event type based on the remaining number of snapshots needed to fill the request, if any. The processor can then transmit the newly updated storage priority to the autonomous vehicle to change the amount of sensor system output that the autonomous vehicle stores.

In another embodiment, the autonomous vehicle is in a fleet of autonomous vehicles. The methodology 400 further includes transmitting the updated storage priority to each of the other autonomous vehicles in the fleet of autonomous vehicles. This causes each of the other autonomous vehicles in the fleet of autonomous vehicles to change the amount of sensor system output stored by the other autonomous vehicles.

In yet another embodiment, the methodology 400 further includes responsive to receiving the request, updating a second storage priority associated a second predefined event type. The second predefined event type is different from the specific predefined event type and the second storage priority can be updated based on the updated storage priority associated with the specific predefined event type. The processor can then transmit the updated second storage priority associated with the second predefined event type to the autonomous vehicle causing the autonomous vehicle to change the amount of sensor system output stored by the autonomous vehicle.

In a further embodiment, the methodology 400 further includes receiving, at the processor, event data from the autonomous vehicle signifying sensor system output stored in the autonomous vehicle when the autonomous vehicle detects the specific predefined event type. The processor can then assign a label indicative of the specific predefined event type to the event data. The processor can further store the labeled event in a data store.

Figure 5:
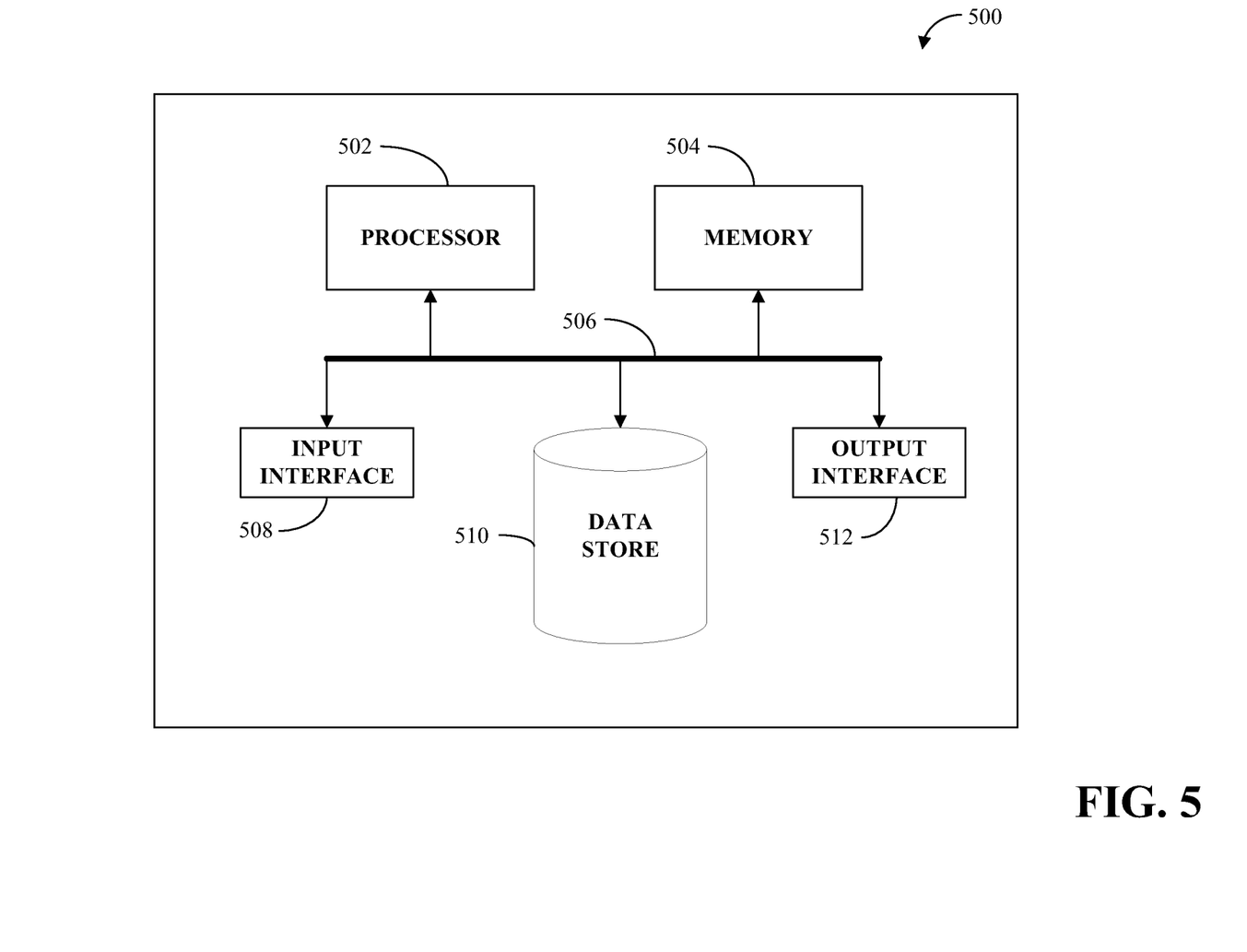
FIG. 5 illustrates a further exemplary computing system.

Referring now to FIG. 5, a high-level illustration of an exemplary computing device that can be used in accordance with the systems and methodologies disclosed herein is illustrated. For instance, the computing device 500 may be or include the mobile computing device or the computing system. The computing device 500 includes at least one processor 502 that executes instructions that are stored in a memory 504. The instructions may be, for instance, instructions for implementing functionality described as being carried out by one or more components discussed above or instructions for implementing one or more methods described above. The processor 502 may be a GPU, a plurality of GPUs, a CPU, a plurality of CPUs, a multi-core processor, etc. The processor 502 may access the memory 504 by way of a system bus 506. In addition to storing executable instructions, the memory 504 may also store geolocation coordinates of suggested locations or landmarks, roadways, user identification, user preferences, etc.

The computing device 500 additionally includes a data store 510 that is accessible by the processor 502 by way of the system bus 506. The data store 510 may include executable instructions, geolocation coordinates of suggested locations or landmarks, roadways, user identification, user preferences, etc. The computing device 500 also includes an input interface 508 that allows external devices to communicate with the computing device 500. For instance, the input interface 508 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
   a processor; and
   memory that stores computer-executable instructions that, when executed by the processor, cause the processor to perform acts comprising:
      receiving, at the computing system, a request to store sensor system outputs for a specific predefined event type, wherein the specific predefined event type comprises a type of event detectable by at least one sensor system of an autonomous vehicle; and
      responsive to receiving the request, remotely causing the autonomous vehicle to update storage priorities respectively associated with various predefined event types, wherein a specific storage priority associated with the specific predefined event type and a differing storage priority associated with a differing predefined event type are remotely caused to be changed based on the request to store the sensor system outputs for the specific predefined event type such that subsets of sensor system outputs of both the specific predefined event type and the differing predefined event type are stored responsive to the specific storage priority and the differing storage priority being changed, wherein a storage priority for a corresponding predefined event type controls a likelihood that the autonomous vehicle stores sensor system outputs of detected occurrences of the corresponding predefined event type such that a subset of the sensor system outputs of the detected occurrences of the corresponding predefined event type are stored by the autonomous vehicle and a remaining subset of the sensor system outputs of the detected occurrences of the corresponding predefined event type are discarded by the autonomous vehicle.

2. The computing system of claim 1, wherein the request further indicates a number of the detected occurrences of the specific predefined event type for which the sensor system outputs are to be stored, wherein the specific storage priority associated with the specific predefined event type is further remotely caused to be updated based on the indicated number.

3. The computing system of claim 2, the acts further comprising:
   receiving event data from the autonomous vehicle signifying sensor system outputs stored in the autonomous vehicle when the autonomous vehicle detects the specific predefined event type, wherein the event data further indicates the number of the detected occurrences of the specific predefined event type that cause the autonomous vehicle to store the sensor system outputs; and
   responsive to receiving the event data, remotely causing the autonomous vehicle to update the specific storage priority associated with the specific predefined event type, wherein the specific storage priority associated with the specific predefined event type is remotely caused to be updated based on a remaining number of the detected occurrences to be stored, wherein the remaining number of the detected occurrences to be stored is based on the indicated number in the request and the number of the detected occurrences indicated in the event data, and wherein the specific storage priority associated with the specific predefined event type is increased as the remaining number of the detected occurrences to be stored decreases.

4. The computing system of claim 1, wherein the specific storage priority associated with the specific predefined event type is further remotely caused to be updated based on another storage priority associated with another predefined event type in the storage priorities.

5. The computing system of claim 1, wherein the specific storage priority is updated based on a parameter of the specific predefined event type, and wherein the parameter of the specific predefined event type comprises a likelihood of the specific predefined event type occurring.

6. The computing system of claim 1, wherein the specific storage priority associated with the specific predefined event type is further remotely caused to be updated based on a transfer rate of data from the autonomous vehicle to a second computing system.

7. The computing system of claim 1, wherein the specific storage priority associated with the specific predefined event type is further remotely caused to be updated based on a storage capacity of the autonomous vehicle to store the sensor system outputs.

8. The computing system of claim 1, wherein the autonomous vehicle is in a fleet of autonomous vehicles, wherein other autonomous vehicles in the fleet are remotely caused to update storage priorities respectively associated with the various predefined event types used by the other autonomous vehicles in response to receiving the request.

9. The computing system of claim 1, wherein the subset of the sensor system outputs of the detected occurrences of the corresponding predefined event type stored by the autonomous vehicle comprises a snapshot of sensor system output for a duration of time that includes a detected occurrence of the corresponding predefined event type.

10. The computing system of claim 9, wherein the duration of time for the snapshot depends on the corresponding predefined event type.

11. A method, comprising:
receiving, at a computing system, a request to store sensor system outputs for a specific predefined event type, wherein the specific predefined event type comprises a type of event detectable by at least one sensor system of an autonomous vehicle; and
responsive to receiving the request, remotely causing the autonomous vehicle to update storage priorities respectively associated with various predefined event types, wherein a specific storage priority associated with the specific predefined event type and a differing storage priority associated with a differing predefined event type are remotely caused to be changed based on the request to store the sensor system outputs for the specific predefined event type such that subsets of sensor system outputs of both the specific predefined event type and the differing predefined event type are stored responsive to the specific storage priority and the differing storage priority being changed, wherein the specific storage priority controls a likelihood that the autonomous vehicle stores the sensor system outputs of detected occurrences of the specific predefined event type such that a subset of the sensor system outputs of the detected occurrences of the specific predefined event type are stored by the autonomous vehicle and a remaining subset of the sensor system outputs of the detected occurrences of the specific predefined event type are discarded by the autonomous vehicle.

12. The method of claim 11, wherein the request further indicates a number of the detected occurrences of the specific predefined event type for which sensor system outputs are to be stored, wherein the specific storage priority associated with the specific predefined event type is further remotely caused to be updated based on the indicated number.

13. The method of claim 12, further comprising:
receiving event data from the autonomous vehicle signifying the sensor system outputs stored in the autonomous vehicle when the autonomous vehicle detects the specific predefined event type, wherein the event data further indicates the number of the detected occurrences of the specific predefined event type that cause the autonomous vehicle to store the sensor system outputs; and
responsive to receiving the event data, remotely causing the autonomous vehicle to update the specific storage priority associated with the specific predefined event type, wherein the specific storage priority associated with the specific predefined event is newly remotely caused to be updated based on a remaining number of the detected occurrences to be stored, wherein the remaining number of the detected occurrences to be stored is based on the indicated number in the request and the number of the detected occurrences indicated in the event data, and wherein the specific storage priority associated with the specific predefined event type is increased as the remaining number of the detected occurrences to be stored decreases.

14. The method of claim 11, wherein the autonomous vehicle is in a fleet of autonomous vehicles, wherein other autonomous vehicles in the fleet are remotely caused to update storage priorities respectively associated with the various predefined event types used by the other autonomous vehicles.

15. The method of claim 11, further comprising:
receiving event data from the autonomous vehicle signifying the sensor system outputs stored in the autonomous vehicle when the autonomous vehicle detects the specific predefined event type;
responsive to receipt of the event data, assigning a label indicative of the specific predefined event type to the event data; and
responsive to labeling the event data, storing the labeled event data in a data store.

16. The method of claim 11, wherein the subset of the sensor system outputs of the detected occurrences of the specific predefined event type stored by the autonomous vehicle comprises a snapshot of sensor system output for a duration of time that includes a detected occurrence of the specific predefined event type.

17. A computer-readable storage medium comprising instructions that, when executed by a processor, cause the processor to perform acts comprising:
receiving a request to store sensor system outputs for a specific predefined event type, wherein the specific predefined event type comprises a type of event detectable by at least one sensor system of an autonomous vehicle; and
responsive to receiving the request, remotely causing the autonomous vehicle to update storage priorities respectively associated with various predefined event types, wherein a specific storage priority associated with the specific predefined event type and a differing storage priority associated with a differing predefined event type are changed based on the request to store the sensor system outputs for the specific predefined event type such that subsets of sensor system outputs of both the specific predefined event type and the differing predefined event type are stored responsive to the specific storage priority and the different storage priority being changed, wherein the specific storage priority controls a likelihood that the autonomous vehicle stores the sensor system outputs of detected occurrences of the specific predefined event type such that a subset of the sensor system outputs of detected occurrences of the specific predefined event type are stored by the autonomous vehicle and a remaining subset of the sensor system outputs of the detected occurrences of the corresponding predefined event type are discarded by the autonomous vehicle, wherein the subset of the sensor system outputs of the detected occurrences of the specific predefined event type stored by the autonomous vehicle comprises a snapshot of sensor system output for a duration of time that includes a detected occurrence of the specific predefined event type.

18. The computer-readable storage medium of claim 17, wherein the acts further comprise:
receiving event data from the autonomous vehicle signifying the sensor system outputs stored in the autonomous vehicle when the autonomous vehicle detects the specific predefined event type;
responsive to receipt of the event data, assigning a label indicative of the specific predefined event type to the event data; and
responsive to labeling the event data, storing the labeled event data in a data store.

19. The computer-readable storage medium of claim 17, wherein the request further indicates a number of the detected occurrences of the specific predefined event type for which sensor system outputs are to be stored, wherein the specific storage priority is further remotely caused to be updated based on the indicated number.

20. The computer-readable storage medium of claim 17, wherein the autonomous vehicle is in a fleet of autonomous vehicles, wherein other autonomous vehicles in the fleet are remotely caused to update storage priorities used by the other autonomous vehicles in response to receiving the request.

* * * * *